(12) United States Patent
Bielec et al.

(10) Patent No.: US 6,197,437 B1
(45) Date of Patent: Mar. 6, 2001

(54) CASTING ALLOYS AND METHOD OF MAKING COMPOSITE BARRELS USED IN EXTRUSION AND INJECTION MOLDING

(75) Inventors: David Martin Bielec, Flat Rock; Samuel Conrad DuBois, Madison Heights; Subramaniam Rangaswamy, Rochester Hills, all of MI (US)

(73) Assignee: Wall Colmonoy Corporation, Madison Heights, MI (US)

( * ) Notice: Subject to any disclaimer, the term of this patent is extended or adjusted under 35 U.S.C. 154(b) by 0 days.

(21) Appl. No.: 09/255,168

(22) Filed: Feb. 22, 1999

(51) Int. Cl.$^7$ ..................................................... B32B 15/04
(52) U.S. Cl. ..................... 428/627; 428/668; 428/678; 428/679; 428/680; 427/591; 427/241; 427/376.6; 427/376.8; 148/425; 148/426; 148/427; 420/435; 420/436; 420/441
(58) Field of Search ................................ 428/627, 668, 428/678, 679, 680; 211/85.22; 220/4.04; 148/426, 427, 425, 408, 409, 410; 420/442, 457, 436, 435, 441; 138/143; 427/591, 241, 376.6, 376.8

(56) References Cited

U.S. PATENT DOCUMENTS

| | | | |
|---|---|---|---|
| 4,769,938 | * | 9/1988 | Chesnut . |
| 5,160,690 | * | 11/1992 | Cox, Jr. . |
| 5,234,510 | * | 8/1993 | DuBois . |
| 5,565,277 | * | 10/1996 | Cox, Jr. . |

* cited by examiner

Primary Examiner—Timothy M. Speer
(74) Attorney, Agent, or Firm—Rader, Fishman & Grauer PLLC

(57) ABSTRACT

A composite barrel for use in extrusion or injection molding is disclosed. The composite barrel includes an outer housing having a cylindrical bore that extends throughout the length of the outer housing. A wear-resistant lining is disposed on an interior surface that defines the cylindrical bore. The lining is fabricated from an alloy that includes a base metal and phosphorus and the lining may contain hard abrasion-resistant particulate, such as tungsten carbide. The base metal is nickel or cobalt or a mixture of nickel and cobalt. The alloy is typically applied by centrifugal casting and can be cast in a nitrogen-rich atmosphere without creating undesirable lining porosity. Such linings can be made for a fraction of the cost of comparable linings that must be cast under vacuum or in an atmosphere of argon.

39 Claims, 3 Drawing Sheets

CASTING ALLOYS AND METHOD OF MAKING COMPOSITE BARRELS USED IN EXTRUSION AND INJECTION MOLDING

BACKGROUND OF THE INVENTION

1. Field of the Invention

This invention relates to materials and methods for protecting metal surfaces, and more particularly to materials and methods for fabricating wear-resistant linings of composite barrels used in injection molding or extrusion.

2. Discussion

Injection molding and extrusion are widely used methods for shaping plastic articles. In single-screw extrusion, solid polymer granules are supplied at one end of a screw that rotates within a cylindrical bore of a temperature-controlled barrel. As the screw rotates, polymer granules advance along the barrel between flights of the screw and an inner wall that demarcates the cylindrical bore. Because of high temperatures and pressures, the polymer granules liquefy as they travel downstream within the barrel. Liquid polymer exits the barrel through a die, rapidly cools and solidifies. Depending on the application, the polymer is cut, rolled or undergoes a second forming operation.

Like extrusion, injection molding employs a screw that rotates in a temperature-controlled barrel to liquefy and consolidate polymer granules. However, in many injection molding machines, the screw also serves as an injection ram. During a plasticating step, the screw rotates and fills, with liquid polymer, a cavity in the barrel located adjacent to the screw tip. A small port, which is sealed with a plug of solidified polymer, connects the cavity with a mold. Pressure generated during the plasticating step is insufficient to dislodge the polymer plug; but during a subsequent injection step, the screw stops rotating and moves forward, forcing liquid polymer into the mold. A check ring located near the screw tip prevents liquid polymer from travelling backwards between flights of the screw.

During extrusion or injection molding, internal barrel pressure can reach 100 MPa or higher. To withstand these high pressures, barrels are typically made from carbon steel, alloy steel or stainless steel. The clearance between the rotating screw and barrel inner wall is small—about $10^{-2}$ cm—and therefore, polymer undergoing processing within the barrel exerts extremely high shearing forces on the bore surface. These high shearing forces, along with high barrel temperatures, corrosive polymer components and abrasive additives, such as $TiO_2$, clay, silica, and carbon fiber, can rapidly erode conventional steel alloys. For this reason, many barrels have a wear-resistant layer or lining that is bonded to the bore surface. Barrels comprised of a steel outer housing and a wear-resistant lining are known as composite barrels or bimetallic barrels.

Composite barrel linings are typically applied using a process known as centrifugal casting. In this process, components of the lining—metal alloys and hard abrasion-resistant particles, for example—are placed in the cylindrical bore of the steel outer housing along with an amount of flux needed to minimize oxidation. Ends of the outer housing are capped to enclose the lining components. In some cases, the inner bore is evacuated and purged with argon gas. The barrel is placed in a high temperature furnace or induction coil and heated to a temperature sufficient to melt the metal alloy components of the lining. During heating, the barrel is often rotated slowly to evenly disperse the lining components. After the metals are melted, the barrel is removed from the high temperature furnace and is rapidly rotated to evenly distribute the lining components on the inner wall of the housing. As the outer housing cools, the metal solidifies and bonds to the inner wall of the outer housing, forming a wear-resistant layer. After the caps are removed, the bore of the composite barrel is honed to a desired diameter.

Although centrifugal casting is widely used to make wear-resistant linings for composite barrels, the method is expensive and its success depends on many factors. For example, the uniformity, morphology and hardness of the lining may depend on the form of the lining charge, the heating and cooling rates of the barrel, the amount of flux used, and whether the bore is evacuated or purged with argon gas during heating. Moreover, the use of argon dramatically increases the method's cost. Nitrogen gas, though much cheaper than argon, is unsuitable for centrifugal casting using known lining materials because its presence results in unacceptable lining quality, as evidenced by porosity, voids, oxidized particles, inclusions, etc. Because centrifugal casting depends on many factors, barrels are often re-spun or rejected, which increases the cost of the method.

The present invention is directed to overcoming, or at least reducing the effects of, one or more of the problems set forth above.

SUMMARY OF THE INVENTION

The present invention provides an alloy for fabricating wear-resistant linings. The alloy can be applied to metal surfaces in a nitrogen-rich atmosphere without creating undesirable lining defects such as porosity. The wear-resistant linings of the present invention can be made for a fraction of the cost of comparable linings that must be cast under conventional controlled atmospheres comprised of argon.

One aspect of the present invention provides a composite barrel that comprises a housing having a first end and a second end and an interior surface defining a cylindrical bore extending from the first end of the housing to the second end of the housing. The composite barrel includes a wear-resistant lining disposed on the interior surface of the housing. The lining is made from an alloy of a base metal and from about 0.5 wt. % to about 12 wt. % phosphorus. The base metal is nickel or cobalt or a mixture of nickel and cobalt. Typically, the alloy also contains about 0.1–26 wt. % chromium, 0.1–3 wt. % boron, 0.1–5 wt. % silicon, 0.1–0.8 wt. % carbon, and 0.1–5 wt. % molybdenum. The alloy may also include up to about 2 wt. % iron, 5 wt. % niobium, 3 wt. % copper, and 8 wt. % tungsten. To improve wear resistance, the lining generally includes one or more hard abrasion-resistant compounds. These include tungsten carbide, vanadium carbide or chromium carbide, either alone or in combination. Tungsten carbide is especially useful and may comprise as much as 60 wt. % of the charge.

A second aspect of the present invention provides a method of making a composite barrel comprised of an outer housing having a cylindrical bore extending throughout its length. The method includes the step of forming a wear-resistant lining—typically by centrifugal casting—on an interior surface that defines the bore. The wear-resistant lining is comprised of a metal alloy and optional hard abrasion-resistant compound, which are described in the preceding paragraph. During the forming step, the cylindrical bore is purged with a nitrogen-rich atmosphere.

DETAILED DESCRIPTION OF THE PREFERRED EMBODIMENTS

Figures 1, 2:
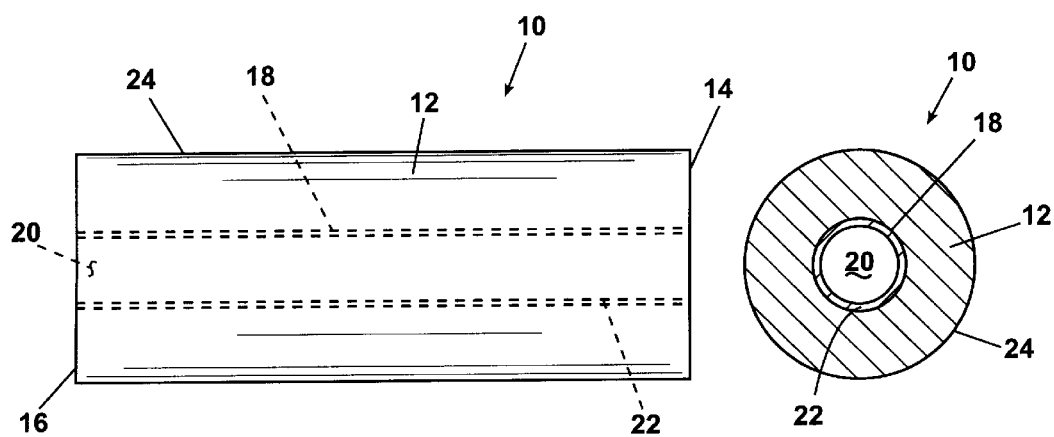
FIG. 1 shows a side view of a composite barrel.
FIG. 2 shows an end view of the composite barrel shown in FIG. 1.

FIG. 1 and FIG. 2 show, respectively, a side view and an end view of a composite barrel 10. The composite barrel 10 comprises an outer housing 12 having a first end 14 and a second end 16. The outer housing is typically fabricated from carbon steel, an alloy steel or a stainless steel. An interior surface 18 defines a cylindrical bore 20 that extends from the first end 14 to the second end 16 of the outer housing 12. A wear-resistant layer or lining 22 is disposed on the interior surface 18 of the outer housing 12. Although the composite barrel 10 will usually have a cylindrical exterior surface 24, the outer housing 12 may have any shape.

The wear-resistant lining 22 comprises an alloy of a base metal and from about 0.5 wt. % to about 12 wt. % phosphorus, though typically, phosphorus comprises about 6 wt. % or less of the alloy. The base metal is nickel or cobalt or a mixture of nickel and cobalt. Generally, the alloy also includes from about 0.1 wt. % to about 26 wt. % chromium, from about 0.1 wt. % to about 3 wt. % boron, from about 0.1 wt. % to about 5 wt. % silicon, from about 0.1 wt. % to about 0.8 wt. % carbon, and from about 0.1 wt. % to about 5 wt. % molybdenum. Ordinarily, chromium comprises about 10 wt. % or less of the alloy. In addition, the alloy may also contain up to about 2 wt. % iron, up to about 5 wt. % niobium, up to about 3 wt. % copper, and up to about 8 wt. % tungsten.

The metal alloys can be manufactured by well known powder manufacturing methods, including gas atomization. Details of the preparation of such alloys, including a nickel-phosphorus alloy containing boron and silicon are provided in U.S. Pat. No. 5,234,510, which is herein incorporated by reference.

To improve wear resistance, the lining 22 generally includes one or more hard abrasion-resistant compounds. These materials remain substantially unmelted throughout lining fabrication. Examples include tungsten carbide, vanadium carbide, or chromium carbide; of these, tungsten carbide is especially useful. The hard abrasion-resistant compounds are available as finely divided powders ranging in size from about 200 microns to less than about 45 microns. The term tungsten carbide refers to all forms of commercially available tungsten carbide powders including, but not limited to, tungsten carbide cemented with cobalt, nickel or a mixture of cobalt and nickel. The lining 22 may contain as much as 60 wt. % tungsten carbide.

Referring again to FIG. 1 and FIG. 2, the wear-resistant lining 22 is normally formed on the interior surface 18 of the outer housing 12 by centrifugal casting. In this process, components of the lining 22, along with an amount of flux needed to minimize oxidation, are placed in the cylindrical bore 20 of the outer housing 12. The lining components are supplied to the cylindrical bore 20 in various forms such as powders, cast ingots, bars, rods and the like. The first 14 and second 16 ends of the outer housing 12 are capped with steel plates (not shown) to enclose the lining components. Next, the cylindrical bore 20 is optionally evacuated through one or more ports in the steel plates and purged with nitrogen. The barrel is placed in a high temperature furnace or induction coil at a temperature sufficient to melt the metal alloy components of the lining, which is typically between about 1550° F. and 2300 ° F. While in the high temperature furnace, the barrel is rotated at about 15 rpm to evenly disperse the lining components. After the metal alloy in the charge is melted, the barrel is removed from the high temperature furnace, placed on rollers and rapidly rotated to evenly distribute the lining components on the inner wall 18 of the housing 12. Typically, this corresponds to a barrel angular velocity that produces about a 70-G centripetal force on the charge. As the outer housing 12 and lining components cool during rotation, the alloy solidifies and bonds to the inner wall 18 of the outer housing 12, forming a wear-resistant layer or lining 22. Once the alloy solidifies, the composite barrel 10 is placed in a insulating media-sand, vermiculite and the like—to ensure that the lining 22 cools at a rate slow enough to prevent it from cracking. After the composite barrel 10 cools to room temperature, the steel plates are removed, and the bore 20 of the composite barrel 10 is honed to a desired diameter.

The disclosed method is more robust and inexpensive than conventional casting processes. For example, the disclosed method allows centrifugal casting in nitrogen-rich atmospheres, which is simpler and cheaper than casting in a vacuum or in an inert environment, such as argon. Surprisingly, the presence of 0.5 wt. % to about 12 wt. % phosphorus in the lining suppresses porosity that normally accompanies centrifugal casting of conventional alloys in a nitrogen-rich environment. Although not bound to any particularly theory, it is believed that phosphorus reduces the formation of boron nitride, which increases melt viscosity and thus porosity of the alloy.

Besides its use in composite barrel linings, the disclosed phosphorus alloys can be used to fabricate other wear-resistant surfaces that ordinarily require furnace processing in a nitrogen-free atmosphere. Examples of such processes include, but are not limited to, high temperature brazing and fused hard phase overlays of nickel base alloys.

EXAMPLES

The following examples are intended as illustrative and non-limiting, and represent specific embodiments of the present invention.

Example 1

One hundred grams of a powder sample of a metal alloy containing 2.2 wt. % phosphorus, 1.2 wt. % boron, 0.2 wt. % carbon, 4.0 wt. % chromium, 2.8 wt. % silicon, 3.0 wt. % molybdenum, and the balance nickel, is placed in an alumina crucible and heated to 2850° F. under a nitrogen atmosphere purge of 2500 cc/min and held for 10 minutes. Heating is carried out in an electric resistance, bottom-loading furnace. Following cooling, the resultant casting is weighed and sectioned. The casting weighs about 100 grams indicating that the metal alloy cast uniformly with no unmelted particles.

Figure 3:
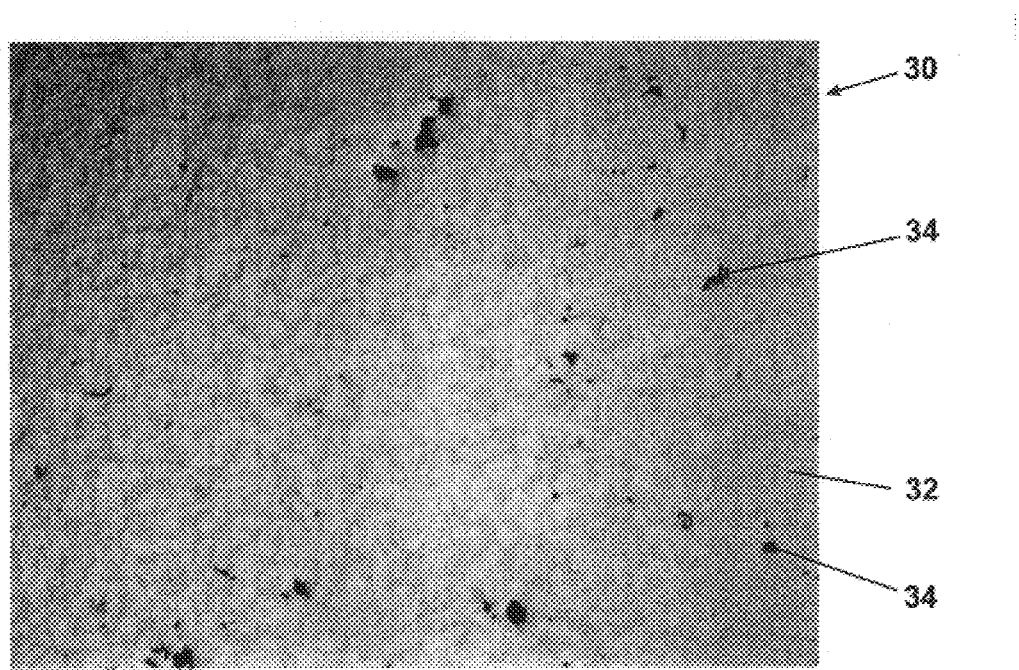
FIG. 3 is a photomicrograph of a cross-section of a metal alloy containing phosphorus that is cast in a nitrogen-rich atmosphere.

FIG. 3 is a photomicrograph of a cross section of the casting 30 at 100 times magnification. The casting 30 comprises a uniform layer of metal alloy 32 with few pores; the pores appear as dark areas 34 in the photomicrograph.

Example 2

Sixty grams of a powder sample of a metal alloy containing 2.2 wt. % phosphorus, 1.2 wt. % boron, 0.2 wt. % carbon, 4.0 wt. % chromium, 2.8 wt. % silicon, 3.0 wt. % molybdenum, and the balance nickel, is mixed with 40 grams of tungsten carbide. The resulting mixture is heated in a horizontal belt furnace (speed 14 in/min) with about an 85/15 $N_2/H_2$ gas mixture at 2005 ° F. for nearly 1 hour. Following cooling, the resultant casting is weighed and sectioned. The casting weighs about 100 grams indicating that the metal alloy cast uniformly with no unmelted particles.

Figure 4:
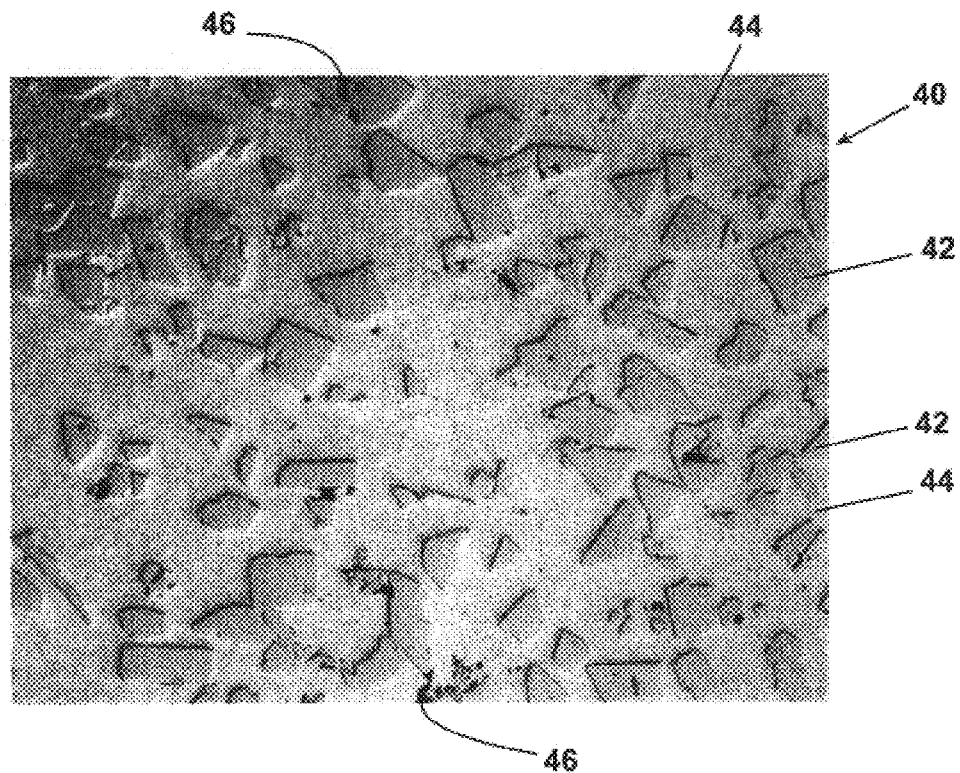
FIG. 4 is a photomicrograph of a cross-section of a metal alloy-tungsten carbide mixture that is cast in a nitrogen-rich atmosphere.

FIG. 4 is a photomicrograph of a cross section of the casting 40 at 100 times magnification. The casting 40 comprises tungsten carbide particles 42 dispersed in a uniform matrix of metal alloy 44. Pores, which appear as dark areas 46 in the photomicrograph represent less than 2% of the cross-sectional area of the casting 40.

Comparative Example 1

One hundred grams of a powder sample of a metal alloy containing 3.2 wt. % boron, 7.0 wt. % chromium, 4.8 wt. % silicon, and the balance nickel, is placed in an alumina crucible and heated to 2850° F. under a nitrogen atmosphere purge of 2500 cc/min and held for 10 minutes. Heating is carried out in an electric resistance, bottom-loading furnace. Following cooling, the resultant casting is weighed and sectioned. The casting weighs about 75 grams indicating that about 25 wt. % of the crucible charge did not alloy. Examination of the casting shows substantial amounts of unmelted, powdery material.

Figure 5:
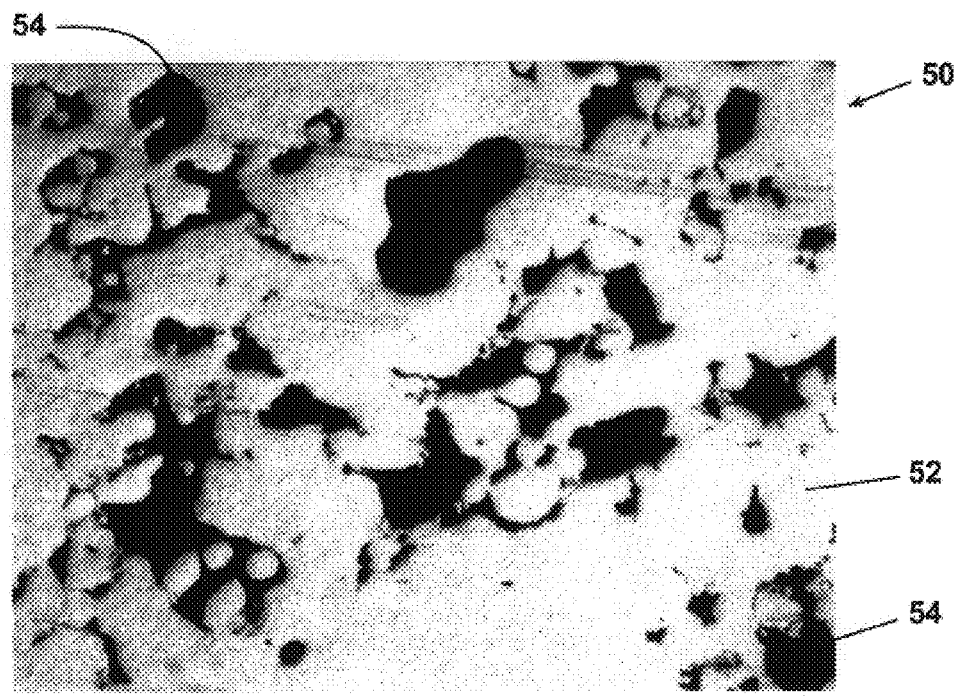
FIG. 5 is a photomicrograph of a cross-section of a non-phosphorus metal alloy that is cast in a nitrogen-rich atmosphere.

FIG. 5 is a photomicrograph of a cross section of the casting 50 at 100 times magnification. When compared to FIG. 3, the casting 50 comprises a non-uniform layer of metal alloy 52 with a large number of pores; the pores appear as dark areas 54 in the photomicrograph.

Comparative Example 2

Sixty grams of a powder sample of a metal alloy containing 3.2 wt. % boron, 7.0 wt. % chromium, 4.8 wt. % silicon, and the balance nickel, is mixed with 40 grams of tungsten carbide. The metal alloy-tungsten carbide mixture is heated in a horizontal belt furnace (speed 14 in/min) with about an 85/15 $N_2/H_2$ gas mixture at 2005° F. for nearly 1 hour.

Figure 6:
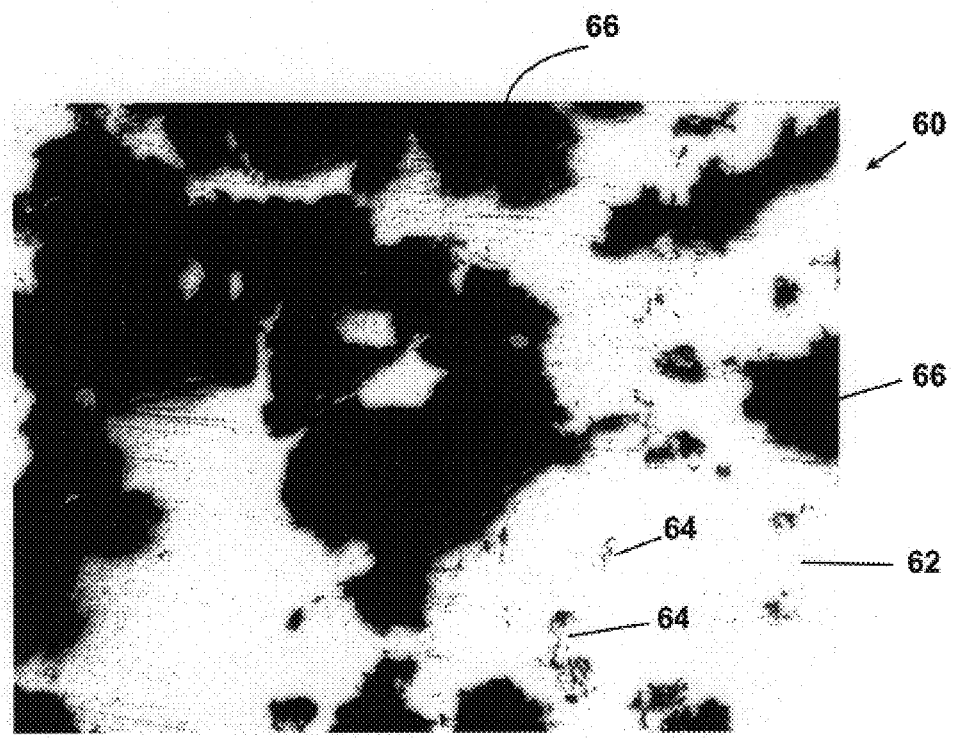
FIG. 6 is a photomicrograph of a cross-section of a non-phosphorus metal alloy-tungsten carbide mixture that is cast in a nitrogen-rich atmosphere.

FIG. 6 is a photomicrograph of a cross section of one resultant casting 60 at 100 times magnification. When compared to FIG. 4, the casting 60 comprises a non-uniform matrix of metal alloy 62; a few tungsten carbide particles 64 are visible. Pores, which appear as dark areas 66 in the photomicrograph account for about 42% of the casting 60.

It is to be understood that the above description is intended to be illustrative and not restrictive. Many embodiments will be apparent to those of skill in the art upon reading the above description. The scope of the invention should therefore be determined not with reference to the above description, but should instead be determined with reference to the appended claims, along with the full scope of equivalents to which such claims are entitled.

What is claimed is:

1. A composite barrel comprising:
   a housing having a first end and a second end and an interior surface defining a cylindrical bore extending from the first end of the housing to the second end of the housing; and
   a wear-resistant lining disposed on the interior surface of the housing, the wear-resistant lining comprising an alloy of a base metal and from about 0.5 wt. % to about 12 wt. % phosphorus;
   wherein the base metal is nickel or cobalt, alone or in combination.

2. The composite barrel of claim 1, wherein the alloy further comprises:
   from about 0.1 wt. % to about 26 wt. % chromium;
   from about 0.1 wt. % to about 3 wt. % boron;
   from about 0.1 wt. % to about 5 wt. % silicon;
   from about 0.1 wt. % to about 0.8 wt. % carbon; and
   from about 0.1 wt. % to about 5 wt. % molybdenum.

3. The composite barrel of claim 2, wherein the alloy further comprises:
   up to about 2 wt. % iron;
   up to about 5 wt. % niobium;
   up to about 3 wt. % copper; and
   up to about 8 wt. % tungsten.

4. The composite barrel of claim 1, wherein the wear-resistant lining further comprises a hard abrasion-resistant compound.

5. The composite barrel of claim 4, wherein the hard abrasion-resistant compound is vanadium carbide, chromium carbide or tungsten carbide, alone or in combination.

6. The composite barrel of claim 5, wherein the hard abrasion-resistant compound is tungsten carbide.

7. The composite barrel of claim 6, wherein the wear-resistant lining comprises up to about 60 wt. % tungsten carbide.

8. A composite barrel comprising:
   a housing having a first end and a second end and an interior surface defining a cylindrical bore extending from the first end to the second end of the housing; and
   a wear-resistant lining disposed on the interior surface of the housing, the wear-resistant lining comprising a hard abrasion-resistant compound and an alloy of a base metal and
   from about 0.5 wt. % to about 12 wt. % phosphorus;
   from about 0.1 wt. % to about 26 wt. % chromium;
   from about 0.1 wt. % to about 3 wt. % boron;
   from about 0.1 wt. % to about 5 wt. % silicon;
   from about 0.1 wt. % to about 0.8 wt. % carbon;
   from about 0.1 wt. % to about 5 wt. % molybdenum;
   up to about 2 wt. % iron;
   up to about 5 wt. % niobium;
   up to about 3 wt. % copper; and
   up to about 8 wt. % tungsten;
   wherein the base metal is nickel or cobalt, alone or in combination.

9. The composite barrel of claim 8, wherein the hard abrasion-resistant compound is vanadium carbide, chromium carbide or tungsten carbide, alone or in combination.

10. The composite barrel of claim 9, wherein the hard abrasion-resistant compound is tungsten carbide.

11. The composite barrel of claim 10, wherein the wear-resistant lining comprises up to about 60 wt. % tungsten carbide.

12. A method of making a composite barrel comprised of a housing having a first end and a second end and an interior surface that defines a cylindrical bore extending from the first end to the second end of the housing, the method comprising the step of:

forming a wear-resistant lining on the interior surface of the housing, the wear-resistant lining comprising an alloy of a base metal and from about 0.5 wt. % to about 12 wt. % phosphorus;

wherein the cylindrical bore is purged with a nitrogen-rich gas during the forming step and the base metal is nickel or cobalt, alone or in combination.

13. The method of claim 12, wherein the alloy further comprises:

from about 0.1 wt. % to about 26 wt. % chromium;
from about 0.1 wt. % to about 3 wt. % boron;
from about 0.1 wt. % to about 5 wt. % silicon;
from about 0.1 wt. % to about 0.8 wt. % carbon; and
from about 0.1 wt. % to about 5 wt. % molybdenum.

14. The method of claim 13, wherein the alloy further comprises:

up to about 2 wt. % iron;
up to about 5 wt. % niobium;
up to about 3 wt. % copper; and
up to about 8 wt. % tungsten.

15. The method of claim 12, wherein the wear-resistant lining further comprises a hard abrasion-resistant compound.

16. The method of claim 15, wherein the hard abrasion-resistant compound is vanadium carbide, chromium carbide or tungsten carbide, alone or in combination.

17. The method of claim 16, wherein the hard abrasion-resistant compound is tungsten carbide.

18. The method of claim 17, wherein the wear-resistant lining comprises up to about 60 wt. % tungsten carbide.

19. The method of claim 12, wherein the forming step is centrifugal casting.

20. The method of claim 19, further comprising the step of heating the housing in a high temperature furnace.

21. The method of claim 19, further comprising the step of heating the housing by induction heating.

22. A method of making a composite barrel comprised of a housing having a first end and a second end and an interior surface that defines a cylindrical bore extending from the first end to the second end of the housing, the method comprising the step of forming a wear-resistant lining on the interior surface of the housing, the wear-resistant lining comprising a hard abrasion-resistant compound and an alloy of a base metal and from about 0.5 wt. % to about 12 wt. % phosphorus;
from about 0.1 wt. % to about 26 wt. % chromium;
from about 0.1 wt. % to about 3 wt. % boron;
from about 0.1 wt. % to about 5 wt. % silicon;
from about 0.1 wt. % to about 0.8 wt. % carbon;
from about 0.1 wt. % to about 5 wt. % molybdenum;
up to about 2 wt. % iron;
up to about 5 wt. % niobium;
up to about 3 wt. % copper; and
up to about 8 wt. % tungsten;

wherein the cylindrical bore is purged with a nitrogen-rich gas during the forming step and the base metal is nickel or cobalt, either alone or in combination.

23. The method of claim 22, wherein the hard abrasion-resistant compound is vanadium carbide, chromium carbide or tungsten carbide, alone or in combination.

24. The method of claim 23, wherein the hard abrasion-resistant compound is tungsten carbide.

25. The method of claim 24, wherein the wear-resistant lining comprises up to about 60 wt. % tungsten carbide.

26. The method of claim 22, wherein the forming step is centrifugal casting.

27. The method of claim 26, further comprising the step of heating the housing in a high temperature furnace.

28. The method of claim 26, further comprising the step of heating the housing by induction heating.

29. A mixture comprising hard abrasion-resistant particles dispersed in an alloy, the alloy comprising a base metal and from about 0.5 wt. % to about 12 wt. % phosphorus;
from about 0.1 wt. % to about 26 wt. % chromium;
from about 0.1 wt. % to about 3 wt. % boron;
from about 0.1 wt. % to about 5 wt. % silicon;
from about 0.1 wt. % to about 0.8 wt. % carbon; and
from about 0.1 wt. % to about 5 wt. % molybdenum;

wherein the base metal is nickel or cobalt, alone or in combination.

30. The mixture of claim 29, wherein the alloy further comprises:

up to about 2 wt. % iron;
up to about 5 wt. % niobium;
up to about 3 wt. % copper; and
up to about 8 wt. % tungsten.

31. The mixture of claim 29, wherein the hard abrasion-resistant compound is vanadium carbide, chromium carbide or tungsten carbide, alone or in combination.

32. The mixture of claim 31, wherein the hard abrasion-resistant compound is tungsten carbide.

33. The mixture of claim 32, wherein the mixture comprises up to about 60 wt. % tungsten carbide.

34. A method of protecting a metal surface comprising the steps of:

depositing an alloy on the metal surface, the alloy comprising a base metal and
from about 0.5 wt. % to about 12 wt. % phosphorus;
from about 0.1 wt. % to about 26 wt. % chromium;
from about 0.1 wt. % to about 3 wt. % boron;
from about 0.1 wt. % to about 5 wt. % silicon;
from about 0.1 wt. % to about 0.8 wt % carbon; and
from about 0.1 wt. % to about 5 wt. % molybdenum; and fusing the alloy to the metal surface by heating the alloy and the metal surface to a temperature greater than the solidus temperature of the alloy;

wherein the metal surface and the alloy are placed in a high temperature furnace containing a nitrogen-rich atmosphere during the fusing step and the base metal is nickel or cobalt, alone or in combination.

35. The method of claim 34, wherein the alloy further comprises:

up to about 2 wt. % iron;
up to about 5 wt. % niobium;
up to about 3 wt. % copper; and
up to about 8 wt. % tungsten.

36. The method of claim 34, further comprising the step of supplying a hard abrasion-resistant compound to the metal surface before the fusing step.

37. The method of claim 36, wherein the hard abrasion-resistant compound is vanadium carbide, chromium carbide or tungsten carbide, alone or in combination.

38. The method of claim 37, wherein the hard abrasion-resistant compound is tungsten carbide.

39. The method of claim 38, wherein the mixture comprises up to about 60 wt. % tungsten carbide.

* * * * *